US010785799B2

(12) United States Patent
Chendamarai Kannan et al.

(10) Patent No.: US 10,785,799 B2
(45) Date of Patent: Sep. 22, 2020

(54) ADAPTIVE MEDIUM SENSING THRESHOLDS

(71) Applicant: QUALCOMM Incorporated, San Diego, CA (US)

(72) Inventors: Arumugam Chendamarai Kannan, San Diego, CA (US); Sanaz Barghi, Carlsbad, CA (US); Vinay Chande, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/189,795

(22) Filed: Nov. 13, 2018

(65) Prior Publication Data

US 2019/0191460 A1   Jun. 20, 2019

Related U.S. Application Data

(60) Provisional application No. 62/588,811, filed on Nov. 20, 2017.

(51) Int. Cl.
*H04W 74/08* (2009.01)
*H04B 17/345* (2015.01)
(Continued)

(52) U.S. Cl.
CPC ...... *H04W 74/0816* (2013.01); *H04B 7/0695* (2013.01); *H04B 17/345* (2015.01);
(Continued)

(58) Field of Classification Search
CPC ............. H04W 74/0816; H04W 24/10; H04W 72/1236; H04W 74/0808; H04B 17/345; H04B 7/0695
See application file for complete search history.

(56) References Cited

U.S. PATENT DOCUMENTS

| 2013/0201975 | A1  | 8/2013 | Chen et al. |
| 2016/0037560 | A1* | 2/2016 | Liu .......................... H04L 51/34 370/329 |
| 2016/0073366 | A1  | 3/2016 | Ng et al. |

OTHER PUBLICATIONS

Qualcomm Incorporated: "Downlink Control Channel Design for Shortened TTI", 3GPP Draft, R1-1611638 DL Control Channel Design for Shortened TTI, 3rd Generation Partnership Project (3GPP), Mobile Competence Centre, 650, Route Des Lucioles, F-06921 Sophia-Antipolis Cedex, FRA vol. RAN WG 1, No. Reno, Nevada, USA, Nov. 14, 2016-Nov. 18, 2016, Nov. 13, 2016 (Nov. 13, 2016), XP051175611, 9 Pages, Retrieved from the Internet: URL:http://www.3gpp.org/ftp/Meetings_3GPP_SYNC/RAN1/Docs/ [retrieved on Nov. 13, 2016].

(Continued)

*Primary Examiner* — Kabir A Timory
(74) *Attorney, Agent, or Firm* — Liem T. Do

(57) ABSTRACT

Methods, systems, and devices for wireless communications are described. A wireless device (e.g., a user equipment and/or base station) may select a beam configuration for a wireless transmission over a channel of a radio frequency spectrum band. The wireless device may perform a listen-before-talk (LBT) procedure on the channel using a LBT detection threshold, wherein the LBT detection threshold is based at least in part on the selected beam configuration. The wireless device may perform the wireless transmission over the channel using the selected beam configuration based at least in part on a success of the LBT procedure.

30 Claims, 12 Drawing Sheets

(51) Int. Cl.
H04B 7/06 (2006.01)
H04W 24/10 (2009.01)
H04W 48/16 (2009.01)
H04W 72/12 (2009.01)
H04W 72/04 (2009.01)
H04W 16/28 (2009.01)
H04W 16/14 (2009.01)

(52) U.S. Cl.
CPC .......... *H04W 24/10* (2013.01); *H04W 48/16* (2013.01); *H04W 72/1236* (2013.01); *H04W 74/0808* (2013.01); *H04W 16/14* (2013.01); *H04W 16/28* (2013.01); *H04W 72/046* (2013.01)

(56) References Cited

OTHER PUBLICATIONS

Broadcom Corporation: "Issues for a High Performance Unlicensed Spectrum Access Protocol for 5G," 3GPP Draft; RWS-150045 BROADCOM_FINAL, 3rd Generation Partnership Project (3GPP), Mobile Competence Centre; 650, Route Des Lucioles; F-06921 Sophia-Antipolis Cedex; France, vol. TSG RAN, No. Phoenix; Sep. 17, 2015-Sep. 18, 2015, Sep. 3, 2015, XP051017193, 7 pages, Retrieved from the Internet: URL: http://www.3gpp.org/ftp/Meetings_3GPP_SYNC/WORKSHOP/Docs/ [retrieved on Mar. 9, 2015].

Ericsson: "On the use of SS for Beam Management," 3GPP Draft; R1-1711019 on the use of SS for Beam Management, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 26, 2017, XP051300219, 4 Pages, Retrieved from the Internet: URL: http://www.3gpp.org/ftp/Meetings_3GPP_SYNC/RAN1/Docs/ [retrieved on Jun. 26, 2017].

Huawei, et al: "Coexistence and Channel Access for NR-based Unlicensed Band Operation," 3GPP Draft; R1-1719841, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017, XP051369564, 7 pages, Retrieved from the Internet: URL: http://www.3gpp.org/ftp/tsg%5Fran/WG1%5FRL1/TSGR1%5F91/Docs/ [retrieved on Nov. 18, 2017].

International Search Report and Written Opinion—PCT/US2018/061068—ISA/EPO—dated Feb. 4, 2019.

LG Electronics: "DRS Design in LAA," 3GPP Draft; R1-155387 DRS Design, 3rd Generation Partnership Project (3GPP), Mobile Competence Centre; 650, Route Des Lucioles; F-06921 Sophia-Antipolis Cedex; France, vol. RAN WG1, No. Malmo, Sweden; Oct. 5, 2015-Oct. 9, 2015, Sep. 26, 2015, XP051021560, 11 pages, Retrieved from the Internet: URL: http://www.3gpp.org/ftp/tsg_ran/WG1_RL1/TSGR1_82b/Docs/ [retrieved on Sep. 26, 2015].

Qualcomm Incorporated: "Shortened PDCCH and Data Multiplexing", 3GPP Draft; R1-1704988 Shortened PDCCH and Data Multiplexing, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017 (Apr. 2, 2017), 6 Pages, XP051243119, Retrieved from the Internet: URL: http://www.3gpp.org/ftp/Meetings_3GPP_SYNC/RAN1/Docs/ [retrieved on Apr. 2, 2017].

ZTE: "Operation on High Frequency Band of Unlicensed Spectrum in NR," 3GPP Draft; R1-1612169—7.1.7 High Frequency Unlicensed in NR, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016, Nov. 13, 2016, XP051176121, 4 pages, Retrieved from the Internet: URL: http://www.3gpp.org/ftp/Meetings_3GPP_SYNC/RAN1/Docs/ [retrieved on Nov. 13, 2016].

* cited by examiner

ADAPTIVE MEDIUM SENSING THRESHOLDS

CROSS REFERENCES

The present Application for Patent claims the benefit of U.S. Provisional Patent Application No. 62/588,811 by CHENDAMARAI KANNAN, et al., entitled "ADAPTIVE MEDIUM SENSING THRESHOLDS," filed Nov. 20, 2017, assigned to the assignee hereof, and expressly incorporated herein.

BACKGROUND

The following relates generally to wireless communication, and more specifically to adaptive medium sensing thresholds.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

mmW wireless communication systems, while promising, present new challenges to old questions. Conventional considerations in developing wireless communication systems focus primarily on avoiding interference between communication devices, often at the expense of reuse. Thus, devices would elect to avoid transmitting out of concerns for interfering with neighboring devices, and the associated transmission opportunity would be wasted. Interference in a mmW wireless communication system, however, is different than in a non-mmW wireless communication system, e.g., such as within a conventional cell coverage area of a base station. For example, beamformed transmissions may have varying beam configurations such that each beam may have a different beam width, a different beam shape, a different beam direction, etc. Generally, a narrow beam width may have a relative deep, but narrow coverage area whereas a wider beam width may have a relative shallow, but wide coverage area. The "coverage area" (or footprint) within the context of a beamformed transmission may vary from one transmission to the next. Detecting the presence (e.g., for interference detection/avoidance, capturing the medium, and the like) of a narrow beam width may be difficult for a device to the left or right of the narrow beam coverage area. Similarly, detecting the presence of a wider beam may be difficult for a device just outside of the wide, but shallow coverage area. Thus, the directionality and configuration of transmit and receive beams provide a certain level of interference isolation in a mmW wireless communication systems. Conventional interference detection/medium access techniques would likely fail in such circumstances.

SUMMARY

The described techniques relate to improved methods, systems, devices, or apparatuses that support adaptive medium sensing thresholds. Generally, the described techniques provide for selecting or otherwise adjusting detection thresholds that are used for a medium capture procedure (e.g., a listen-before-talk (LBT) procedure) based on the beam configuration and, in some examples, other factors. Such granularity in setting the LBT detection threshold provides improved interference detection/medium capture techniques in a wireless communication system where beamformed communications occur. For example, a wireless device (such as a user equipment (UE) and/or base station) may be operating in a millimeter wave (mmW) wireless communication system and determine that a wireless transmission is to occur using a beamformed signal. The wireless device may determine the beam configuration (e.g., the beam width, the beam shape, the beam direction, and the like) for the wireless transmission and select the LBT detection threshold based on the beam configuration. The wireless device may perform the LBT procedure using the LBT detection threshold (e.g., an energy based and/or preamble based LBT procedure) to determine whether the channel is available. Provided that the LBT procedure is successful, e.g., the LBT detection threshold is not satisfied, the wireless device may perform the wireless transmission on the channel. In some aspects, the wireless device may also consider a variety of other parameters when selecting the LBT detection threshold, either alone or in combination. Examples of such parameters may include, but are not limited to, the type of communication detected during the LBT procedure (e.g., data vs. control communications), the type of wireless transmission the wireless device is to perform (e.g., interference discovery vs. data transmission, transmission rank, etc.), and the like. Accordingly, each parameter may be assigned a weighting factor that, when considered together and in conjunction with the beam configuration, may provide fine scaling of the selection of the LBT detection threshold.

A method of wireless communication is described. The method may include selecting a beam configuration for a wireless transmission over a channel of a radio frequency spectrum band, performing a LBT procedure on the channel using a LBT detection threshold, wherein the LBT detection threshold is based at least in part on the selected beam configuration, and performing the wireless transmission over the channel using the selected beam configuration based at least in part on a success of the LBT procedure.

An apparatus for wireless communication is described. The apparatus may include means for selecting a beam configuration for a wireless transmission over a channel of a radio frequency spectrum band, means for performing a LBT procedure on the channel using a LBT detection threshold, wherein the LBT detection threshold is based at least in part on the selected beam configuration, and means for performing the wireless transmission over the channel using the selected beam configuration based at least in part on a success of the LBT procedure.

Another apparatus for wireless communication is described. The apparatus may include a processor, memory in electronic communication with the processor, and instructions stored in the memory. The instructions may be operable to cause the processor to select a beam configuration for a wireless transmission over a channel of a radio frequency spectrum band, perform a LBT procedure on the channel using a LBT detection threshold, wherein the LBT detection threshold is based at least in part on the selected beam configuration, and perform the wireless transmission over the channel using the selected beam configuration based at least in part on a success of the LBT procedure.

A non-transitory computer-readable medium for wireless communication is described. The non-transitory computer-readable medium may include instructions operable to cause a processor to select a beam configuration for a wireless transmission over a channel of a radio frequency spectrum band, perform a LBT procedure on the channel using a LBT detection threshold, wherein the LBT detection threshold is based at least in part on the selected beam configuration, and perform the wireless transmission over the channel using the selected beam configuration based at least in part on a success of the LBT procedure.

Some examples of the method, apparatus, and non-transitory computer-readable medium described above may further include processes, features, means, or instructions for selecting an LBT beam configuration for the LBT procedure on the channel, the LBT beam configuration being the same as the beam configuration for the wireless transmission over the channel.

Some examples of the method, apparatus, and non-transitory computer-readable medium described above may further include processes, features, means, or instructions for selecting an LBT beam configuration for the LBT procedure on the channel, the LBT beam configuration being different from the beam configuration for the wireless transmission over the channel. Some examples of the method, apparatus, and non-transitory computer-readable medium described above may further include processes, features, means, or instructions for applying an offset to the LBT detection threshold based at least in part on the LBT beam configuration being different from the beam configuration for the wireless transmission over the channel.

In some examples of the method, apparatus, and non-transitory computer-readable medium described above, the LBT beam configuration may have a wider beam width than the beam configuration for the wireless transmission over the channel, and the offset may be a function of the difference in beam width between the LBT beam configuration and the beam configuration for the wireless transmission over the channel.

Some examples of the method, apparatus, and non-transitory computer-readable medium described above may further include processes, features, means, or instructions for determining that the wireless transmission comprises a reservation request (RRQ) signal. Some examples of the method, apparatus, and non-transitory computer-readable medium described above may further include processes, features, means, or instructions for selecting the LBT detection threshold based at least in part on the RRQ signal.

Some examples of the method, apparatus, and non-transitory computer-readable medium described above may further include processes, features, means, or instructions for determining that the wireless transmission comprises a reservation response (RRS) signal. Some examples of the method, apparatus, and non-transitory computer-readable medium described above may further include processes, features, means, or instructions for selecting the LBT detection threshold based at least in part on the RRS signal.

Some examples of the method, apparatus, and non-transitory computer-readable medium described above may further include processes, features, means, or instructions for determining that the wireless transmission comprises an interference discovery signal. Some examples of the method, apparatus, and non-transitory computer-readable medium described above may further include processes, features, means, or instructions for selecting the LBT detection threshold based at least in part on the interference discovery signal.

Some examples of the method, apparatus, and non-transitory computer-readable medium described above may further include processes, features, means, or instructions for identifying an expected receive signal strength value for a scheduled wireless communication to the wireless device. Some examples of the method, apparatus, and non-transitory computer-readable medium described above may further include processes, features, means, or instructions for selecting the LBT detection threshold based at least in part on the expected receive signal strength value.

Some examples of the method, apparatus, and non-transitory computer-readable medium described above may further include processes, features, means, or instructions for identifying a transmission rank associated with the wireless transmission over the channel. Some examples of the method, apparatus, and non-transitory computer-readable medium described above may further include processes, features, means, or instructions for selecting the LBT detection threshold based at least in part on the transmission rank.

Some examples of the method, apparatus, and non-transitory computer-readable medium described above may further include processes, features, means, or instructions for identifying a transmission rank associated with an interfering transmission over the channel. Some examples of the method, apparatus, and non-transitory computer-readable medium described above may further include processes, features, means, or instructions for selecting the LBT detection threshold based at least in part on the transmission rank.

Some examples of the method, apparatus, and non-transitory computer-readable medium described above may further include processes, features, means, or instructions for determining that an interfering transmission may be from a device associated with an operator that may be associated with the wireless device. Some examples of the method, apparatus, and non-transitory computer-readable medium described above may further include processes, features, means, or instructions for selecting the LBT detection threshold based at least in part on the operator.

Some examples of the method, apparatus, and non-transitory computer-readable medium described above may further include processes, features, means, or instructions for determining that an interfering transmission may be from a device associated with a first operator that different from a second operator that may be associated with the wireless device. Some examples of the method, apparatus, and non-transitory computer-readable medium described above may further include processes, features, means, or instructions for selecting the LBT detection threshold based at least in part on the first operator.

Some examples of the method, apparatus, and non-transitory computer-readable medium described above may further include processes, features, means, or instructions for identifying a quality-of-service (QoS) metric associated with the wireless transmission over the channel. Some examples of the method, apparatus, and non-transitory computer-readable medium described above may further include processes, features, means, or instructions for selecting the LBT detection threshold based at least in part on the QoS metric.

Some examples of the method, apparatus, and non-transitory computer-readable medium described above may further include processes, features, means, or instructions for identifying a QoS metric associated with an interfering transmission. Some examples of the method, apparatus, and non-transitory computer-readable medium described above may further include processes, features, means, or instructions for selecting the LBT detection threshold based at least in part on the QoS metric.

Some examples of the method, apparatus, and non-transitory computer-readable medium described above may further include processes, features, means, or instructions for identifying a transmission direction associated with the wireless transmission over the channel. Some examples of the method, apparatus, and non-transitory computer-readable medium described above may further include processes, features, means, or instructions for selecting the LBT detection threshold based at least in part on the transmission direction.

Some examples of the method, apparatus, and non-transitory computer-readable medium described above may further include processes, features, means, or instructions for identifying a transmission direction associated with an interfering transmission over the channel. Some examples of the method, apparatus, and non-transitory computer-readable medium described above may further include processes, features, means, or instructions for selecting the LBT detection threshold based at least in part on the transmission direction.

In some examples of the method, apparatus, and non-transitory computer-readable medium described above, the beam configuration comprises at least one of: a new radio synchronization signal (NR-SS) beam configuration, or a P1 beam configuration, or a P2 beam configuration, or a P3 beam configuration.

In some examples of the method, apparatus, and non-transitory computer-readable medium described above, the LBT detection threshold comprises at least one of: an energy level detection threshold, or a preamble detection threshold, or a combination thereof.

DETAILED DESCRIPTION

Figure 1:
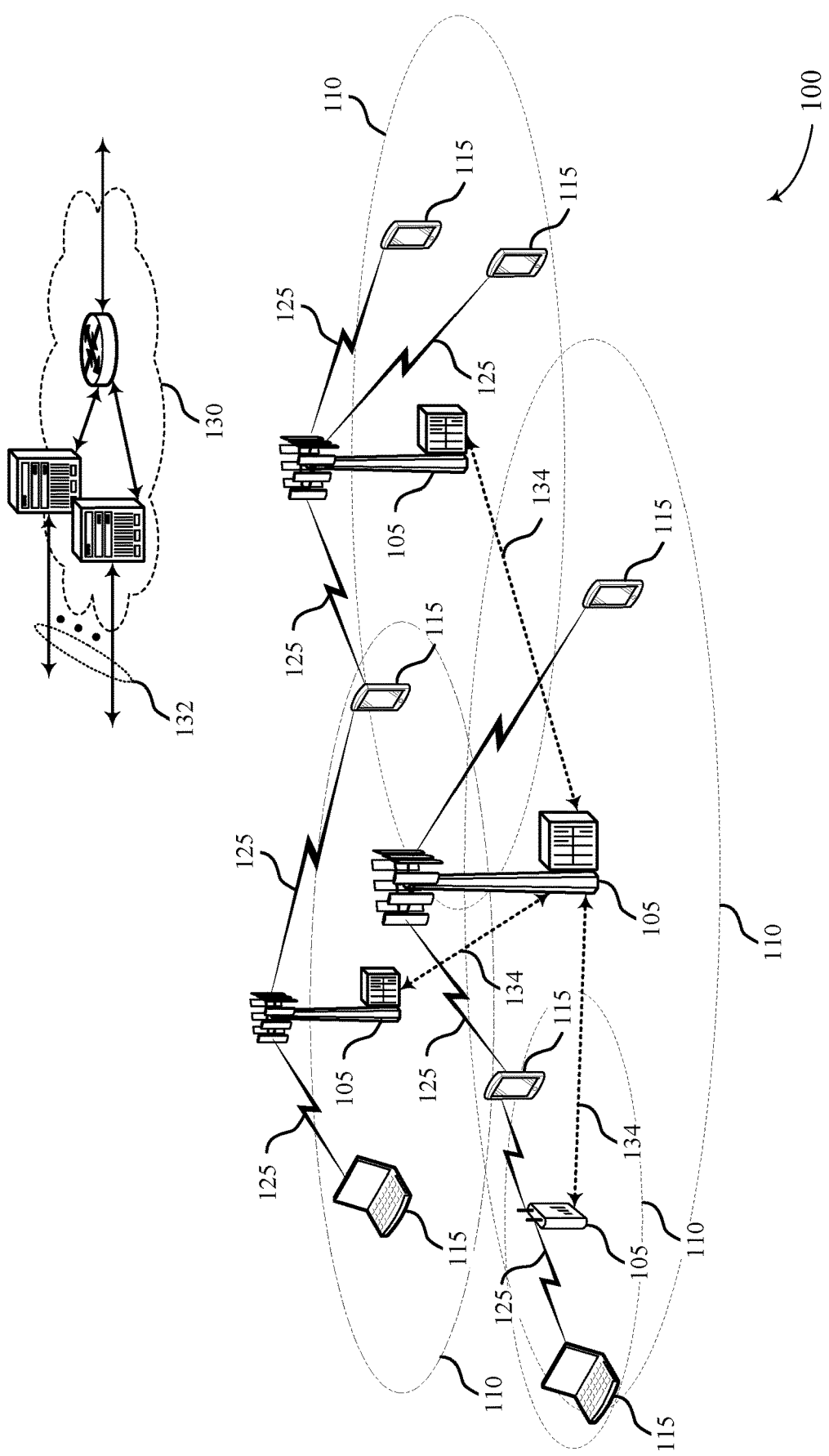
FIG. 1 illustrates an example of a system for wireless communication that supports adaptive medium sensing thresholds in accordance with aspects of the present disclosure.

Next generation wireless communication systems may rely on millimeter wave (mmW) communication technologies. mmW technologies typically use beamformed transmissions/receptions to provide directional communications. Each beamformed transmission/reception may have an associated beam configuration, such as a beam width, a beam direction, a beam shape, and the like. A transmit beam may refer to a digital/analog antenna configuration that provides a directional transmission towards a receiving device, such as a user equipment (UE). A receive beam may refer to a digital/analog antenna configuration that provides directional reception of a beam from a transmitting device. For a beam pair used for wireless communications, the transmit beam may be the same as or different from the receive beam (e.g., due to beam reflection, diffraction, and the like). The transmit/receive beams may change for each transmission.

mmW wireless communication systems present unique challenges with respect to interference management, medium access, and the like. For example, the directionality of transmissions and/or receptions prove a certain level of interference isolation in mmW systems. Moreover, mmW communications in an asynchronous (or partially synchronized) network also introduce unique challenges. Conventional design techniques may opt for transmission restraint to avoid interference, which may minimize channel reuse and lead to wasted resources.

Aspects of the disclosure are initially described in the context of a wireless communications system, such as a mmW wireless communications system. In some aspects, a wireless device (e.g., a UE and/or a base station) may be considered a potential victim wireless device in that transmissions on a channel may cause or increase interference and/or create difficulties with respect to medium capture for the device. A wireless device may be considered a potential aggressor wireless device in that transmissions on the channel may cause or increase interference for a potential victim wireless device. In some aspects, the potential aggressor wireless device may perform a listen-before-talk (LBT) procedure on the channel, e.g., to capture the channel for a wireless transmission. The wireless device may be configured to select an LBT detection threshold (e.g., energy level and/or preamble or other message based detection thresholds) based on a beam configuration for the wireless transmission. For example, a first LBT detection threshold may be selected for use during the LBT procedure for a narrow beam width (e.g., a P1 beam configuration) and a second LBT detection threshold may be selected for use during the LBT procedure for a wider beam width (e.g., a P2 beam configuration or a new radio synchronization signal (NR-SS) beam configuration). In some aspects, the wireless device may also consider other factors or parameters when selecting the LBT detection threshold to use during the LBT procedure. For example, the type of wireless transmission to be performed and/or detected, the priorities of the wireless transmission or detected transmission (e.g., quality-of-service (QoS), rank, etc.), the operator of the wireless device, the operator of a wireless device detected during the LBT procedure, and the like. Accordingly, the wireless device may have fine granularity for selecting the LBT detection threshold to be used during the LBT procedure. The wireless device may then perform the LBT procedure on the channel using the LBT detection threshold and, if successful, perform the wireless transmission on the channel.

Aspects of the disclosure are further illustrated by and described with reference to apparatus diagrams, system diagrams, and flowcharts that relate to adaptive medium sensing thresholds.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A wireless device (e.g., a UE 115 and/or base station 105) may select a beam configuration for a wireless transmission over a channel of a radio frequency spectrum band. The wireless device may perform a LBT procedure on the channel using a LBT detection threshold, wherein the LBT detection threshold is based at least in part on the selected beam configuration. The wireless device may perform the wireless transmission over the channel using the selected beam configuration based at least in part on a success of the LBT procedure.

Figure 2:
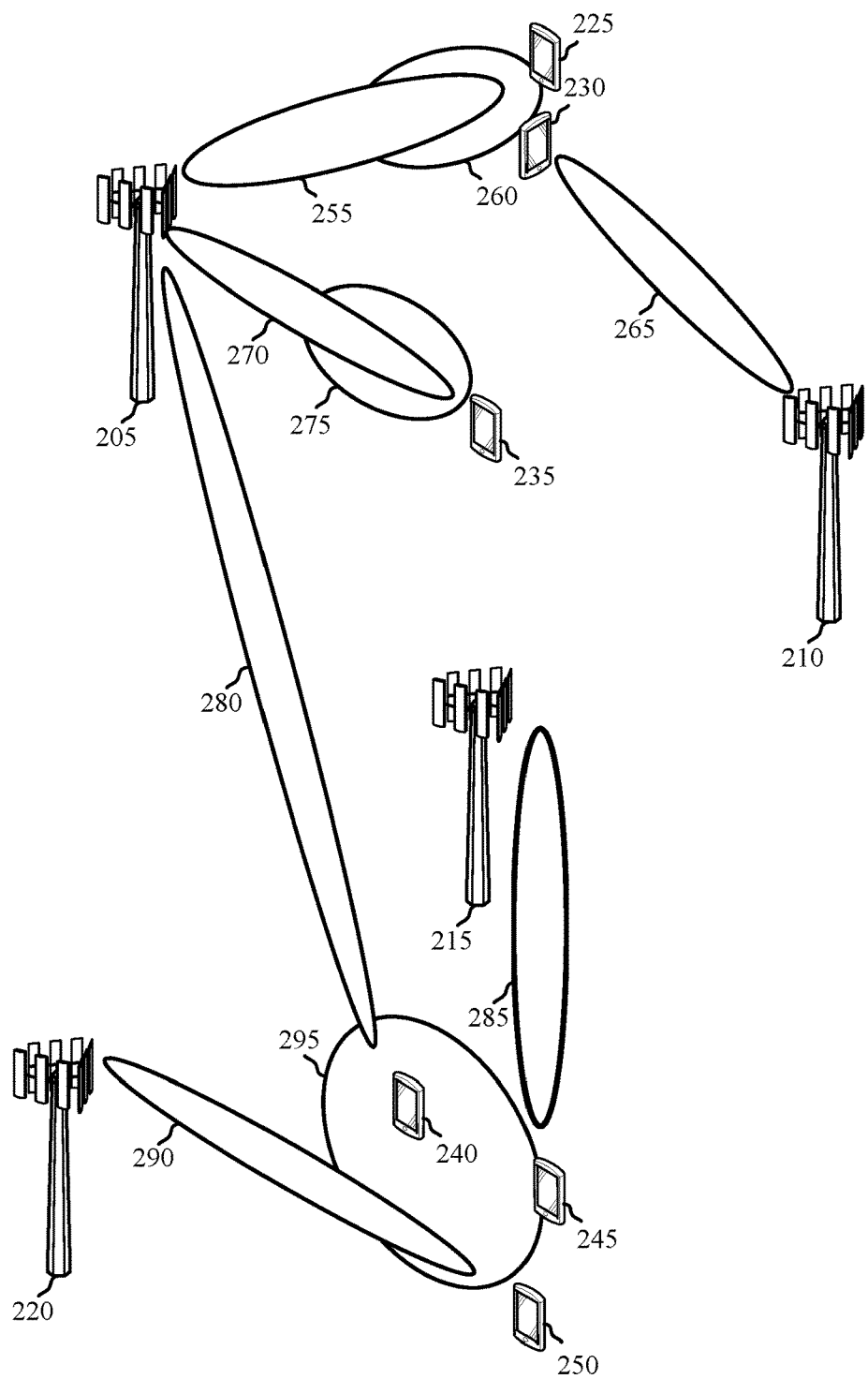
FIG. 2 illustrates an example of a system for wireless communication that supports adaptive medium sensing thresholds in accordance with aspects of the present disclosure.

FIG. 2 illustrates an example of a wireless communications system 200 that supports adaptive medium sensing thresholds in accordance with various aspects of the present disclosure. In some examples, wireless communications system 200 may implement aspects of wireless communications system 100. Wireless communications system 200 may include base stations 205, 210, 215, and 220 and UE 225, 230, 235, 240, 245, and 250, which may be examples of the corresponding devices described herein. Wireless communications system 200 may be a mmW wireless communication system.

In some aspects, some or all of base stations 205, 210, 215, and/or 220 may belong to the same operator or to one or more different operators. Generally, base station 205 may be associated with UEs 225, 235, and 240. For example, base station 205 may communicate with UE 225 in the downlink using beam configuration 255 and in the uplink using beam configuration 260, with UE 235 in the downlink using beam configuration 270 and in the uplink using beam configuration 275, and with UE 240 in the downlink using beam configuration 280. Base station 210 may be associated with UE 230 and communicate in the downlink using beam configuration 265. Base station 215 may be associated with UE 245 and communicate in the downlink using beam configuration 285. Base station 220 may be associated with UE 250 and communicate in the downlink using beam configuration 290 and in the uplink using beam configuration 295. However, it is to be understood that each beam configuration may be a transmit beam configuration and/or a receive beam configuration for the respective wireless device.

In some aspects, each beam configuration may have different properties, e.g., beam width, beam shape, beam timing, beam transmit power, and the like. In some aspects, beam configurations 255, 265, 270, 280, 285, and/or 290 may be considered to have narrow beam widths and, in some examples, may be examples of P1 and/or P2 beams. In some aspects, beam configurations 260, 275, and/or 295 may be considered to have wide beam widths and, in some examples, may be examples of P3 beams.

Generally, the directionality and configuration of transmit and receive beams provide a certain level of interference isolation in a mmW wireless communication systems. For example, UE 230 may experience a certain degree of interference from uplink transmissions from UE 225 using beam configuration 260 and/or downlink communications from base station 205 using beam configuration 255. UE 225 may experience a certain degree of interference from downlink communications from base station 210 using beam configuration 265. UE 235, however, being more isolated from neighboring wireless devices may not experience interference. UEs 240 and/or 245 may experience a certain degree of isolation from uplink transmissions from UE 250 using beam configuration 295, but not experience interference from downlink transmissions from base station 220 using beam configuration 290. UE 250 may experience a certain degree of interference from downlink transmissions from base station 215 using beam configuration 285, but not from uplink transmissions from UEs 240 and/or 245.

Accordingly, each wireless device (e.g., UEs and/or base stations) of wireless communications system 200 may be configured to perform aspects of the described techniques for adaptive medium sensing thresholds. Each wireless device may leverage the asymmetry in the beam directions, beam widths, and time to select variable energy and/or preamble detection thresholds to use during the LBT procedure. For example, different energy and/or preamble based LBT detection thresholds may be employed by a wireless device on a per beam (e.g., beam index) basis. The thresholds may be chosen from a range of values (e.g., Q1 to Q2) and/or from a finite set of thresholds (e.g., Q1, Q2, Q3, Q4). Selecting the LBT detection threshold on a per beam basis and based on the beam configuration may provide a fine degree of control over what is determined to be an interfering transmission and what transmission might not cause or increase interference to an unacceptable level. The LBT detection threshold may include an energy level detection threshold and/or a message based (e.g., preamble message) detection threshold.

As one example, each of UEs 225, 235, and 240 may be configured to perform an LBT procedure to capture the medium (e.g., channel) before performing a wireless transmission to base station 205. Each UE may select their corresponding beam configuration that will be used for the wireless transmission (e.g., beam configurations 260, 275, and 280) and use the beam configuration to select an LBT detection threshold to use during the LBT procedure. Provided that the LBT procedure is successful (e.g., there are no interfering transmission detected during the LBT procedure that satisfy a threshold), the UE will capture the channel and perform the wireless transmission to base station 205.

Generally, each wireless device may use the described techniques where the LBT detection threshold is selected based on the beam configuration. In some aspects, each wireless device may additionally consider other parameters when selecting the LBT detection threshold. Each of the additional parameters may be considered individually, in combination, and the like. In some aspects, each additional parameter may be assigned a weighting factor that is fixed and/or may be adjusted based on which additional parameters are being considered.

One example of an additional parameter may include whether the wireless device (e.g., UE and/or base station) selects a beam configuration to use during the LBT procedure that is the same as, or different from the beam configuration to be used for the wireless transmission. For example, the wireless device may select the same beam configuration for the LBT procedure as for the wireless transmission and therefore select the LBT detection threshold based on the same beam configuration. In a base station example, the base station may use different LBT detection thresholds for medium sensing prior to using P1 and P2 beam configurations. In a UE example, the UE may use different LBT detection thresholds for medium sensing prior to using different beam-widths within P3 beam configurations. However, in some examples the wireless device may select an LBT beam configuration that is different from the beam configuration to be used for the wireless transmission. For example, the wireless transmission may be performed on a P2 beam configuration with LBT procedure being performed on a P1 beam or an NR-SS beam. Accordingly, the wireless device may use a relative offset to the LBT detection thresholds in cases where the LBT beam configuration and the beam configuration of the wireless transmission and/or reception have different beam widths. The magnitude of the offset may be a function of the difference in beam widths between the LBT beam configuration and the beam configuration used for the wireless transmission. In one non-limiting example, the offset may be defined for NR-SS beams relative to P1/P2 and P3 beams.

In another example of an additional parameter, the wireless device may select (or adjust) the LBT detection threshold based on the type of wireless transmission being performed. For example, the LBT detection threshold may be selected based on whether the wireless transmission is a reservation request signal (RRQ) transmission, a reservation response signal (RRS), a data transmission, a non-data transmission, the transmission rank of the wireless transmission, the QoS requirements for the wireless transmission, and the like.

In another example of an additional parameter, the wireless device may select (or adjust) the LBT detection threshold based on the type of wireless transmission detected during the LBT procedure, e.g., dynamically adjusted during the LBT procedure and/or adjusted post-LBT procedure when determining whether the detected transmission constitutes interference. For example, the LBT detection threshold may be selected based on whether the transmission is a RRQ transmission, a RRS, a data transmission, a non-data transmission, the transmission rank of the transmission, the QoS requirements for the transmission, the duty cycle of the transmission, and the like.

In another example of an additional parameter, the wireless device may select (or adjust) the LBT detection threshold based on the operator of the wireless device as compared to the operator of devices detected during the LBT procedure.

In another example of an additional parameter, the wireless device may select (or adjust) the LBT detection threshold based on the transmission direction. For example, the LBT detection threshold may be selected based on whether the wireless transmission is an uplink transmission or a downlink transmission and/or based on whether the interfering transmission is an uplink transmission or downlink transmission.

In another example of an additional parameter, the wireless device may select (or adjust) the LBT detection threshold based on the expected received signal strength. For example, the wireless device may perform the LBT procedure to perform a wireless transmission that is associated with a scheduling operation, e.g., to confirm receipt of a paging signal, as part of a RRQ/RRS exchange, and the like. The wireless device may know, e.g., based on receiving previous wireless transmissions, what the expected receive signal strength is from the transmitting wireless device. Accordingly, the wireless device may select the LBT detection threshold based on the expected receive signal strength. In some aspects, the wireless device may use a ratio of the observed energy (or preamble) detected during the LBT procedure to the expected received signal strength when selecting the LBT detection threshold.

Figure 3A:
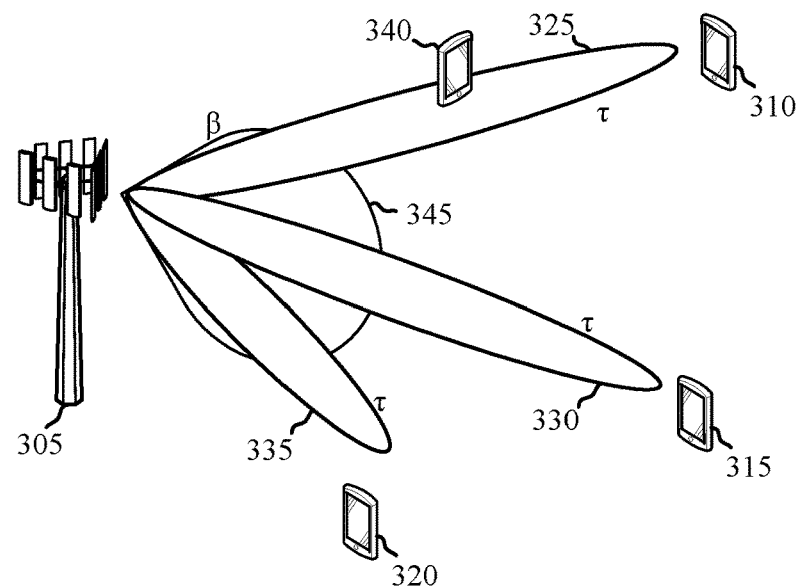
FIGS. 3A & 3B illustrate examples of a system for wireless communication that supports adaptive medium sensing thresholds in accordance with aspects of the present disclosure.
Figure 3B:
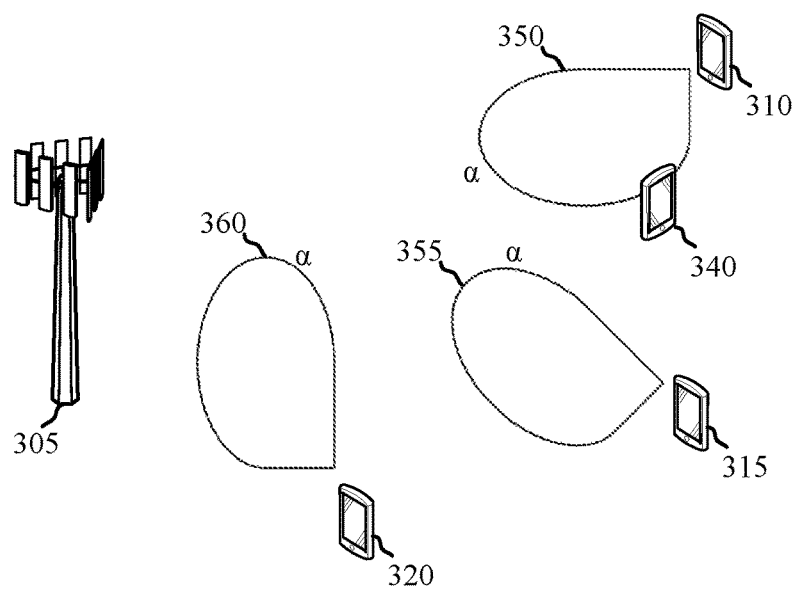

FIGS. 3A & 3B illustrate examples of a wireless communications system 300 that supports adaptive medium sensing thresholds in accordance with various aspects of the present disclosure. In some examples, wireless communications system 300 may implement aspects of wireless communication systems 100/200. Wireless communications system 300 may include a base station 305 and UEs 310, 315, and 320, which may be examples of the corresponding devices described herein. Generally, wireless communications system 300-a of FIG. 3A illustrates an example downlink communication scenario and wireless communications system 300-b of FIG. 3B illustrates an example uplink communication scenario. Wireless communications system 300 may be a mmW wireless communication system.

Generally, base station 305 may be associated with UEs 310, 315, and 320. For example, base station 305 may communicate with UE 310 in the downlink using beam configuration 325 and in the uplink using beam configuration 350. Base station 305 may communicate with UE 315 in the downlink using beam configuration 330 and in the uplink using beam configuration 355. Base station 305 may communicate with UE 320 in the downlink using beam configuration 335 and in the uplink using beam configuration 360. In some aspects, base station 305 may communicate in the downlink using beam configuration 345. Generally, UE 340 may be considered a potential victim node in that, in some scenarios, communications between base station 305 and certain of the associated UEs may interfere with UE 340.

In some aspects, some or all of the wireless devices of wireless communications system 300 may be configured to support adaptive medium sensing thresholds. For example, each device may select an LBT detection threshold based on the beam configuration. As one example, base station 305 may select an LBT detection threshold ($\tau$) for downlink beam configurations 325, 330, and 335. Base station 305 may select an LBT detection threshold (13) for downlink beam configuration 345. That is, beam configurations 325/330/335 each have different beam properties (e.g., beam width, beam shape, etc.) with respect to beam configuration 345. Therefore, selecting different LBT detection thresholds based on the beam configurations provides fine granularity in determining what constitutes interference during an LBT procedure, e.g., accounts for the different coverage footprints of the respective beam configurations.

In some aspects, beam configurations 325, 330, and 335 may be examples of a NR-SS beam configuration, P1 beam configuration, and/or P2 beam configuration. Broadly, NR-SS beams may be considered wide beams that are used for synchronization channel transmission, P1 beams may be considered narrower beams that are used for directional transmissions (e.g., to specific UEs such as broadcast signals), and P2 beams may be considered even more narrow beams that are used for more directional, deeper transmissions. In some examples, beam configurations 325, 330, and 335 may be considered P2 beam configurations and beam configuration 345 may be considered a P1 beam configuration.

In some aspects, interference from P1 beams may be different than interference from P2 beams. For example, P1 beams are likely to interfere with more nodes (e.g., likely to have a lower received power strength for the same distance of separation) and P2 beams are likely to interfere with fewer nodes (e.g., likely to have greater received power strength for the same distance of separation). Accordingly, selecting different LBT detection thresholds for the LBT procedure may take into account such differences and provide a more refined degree of interference detection.

As another example, any of UEs 310, 315, and/or 320 may select an LBT detection threshold (a) for beam configurations 350, 355, and 360, respectively. The LBT detection threshold (a) may account for the respective coverage footprint of the beam configuration. In some aspects, beam configurations 350, 355, and 360 may be considered P3 beam configurations. P3 beams may be considered receive beam configurations used by the UEs for further beam refinement.

Accordingly, any of the wireless devices of wireless communications system 300 may be configured to select a beam configuration to use for a wireless transmission and then select a LBT detection threshold based on the beam configuration. The wireless device may perform the LBT procedure using the selected LBT detection threshold to detect, identify, and/or classify interference in general and determine if the interference will interrupt the wireless device's wireless transmission more particularly. The wireless device may also consider a variety of additional parameters, as is described herein, when selecting the LBT detection threshold to use during the LBT procedure.

Figure 4:
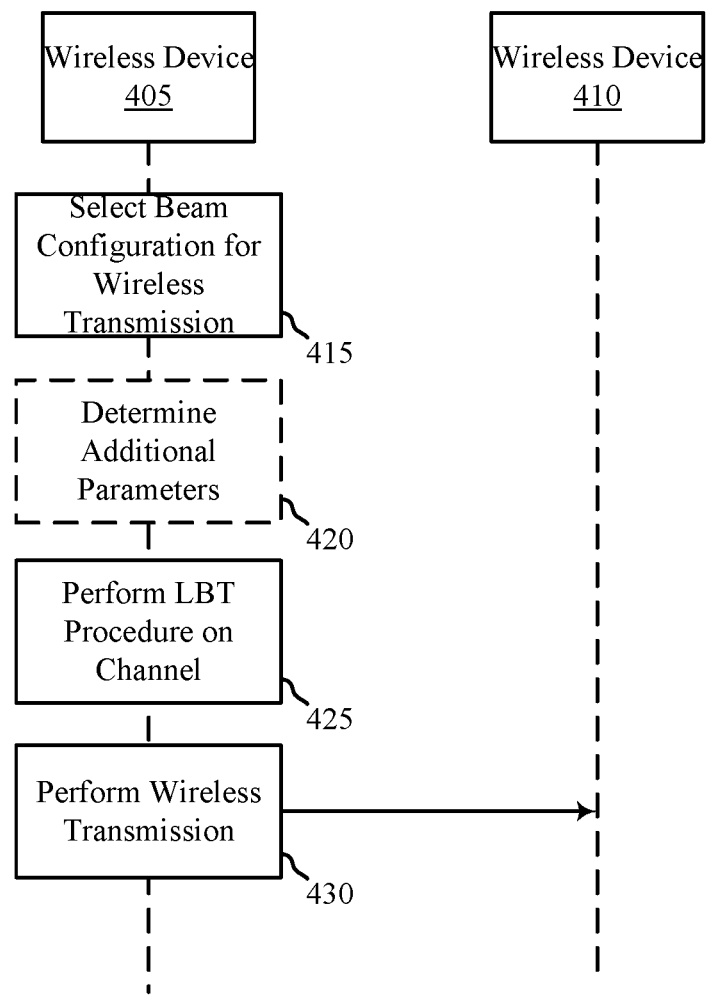
FIG. 4 illustrates an example of a process that supports adaptive medium sensing thresholds in accordance with aspects of the present disclosure.

FIG. 4 illustrates an example of a process 400 that supports adaptive medium sensing thresholds in accordance with various aspects of the present disclosure. In some examples, process 400 may implement aspects of wireless communication systems 100/200/300. Process 400 may include a wireless device 405 and wireless device 410, each of which may be a UE and/or base station, which may be examples of the corresponding devices described herein.

At 415, wireless device 405 may select a beam configuration for a wireless transmission over a channel. The beam configuration may be a P1 beam configuration, a P2 beam configuration, a P3 beam configuration, a NR-SS beam configuration, and the like. The beam configuration may have certain beam properties, such as beam width, beam shape, beam direction, beam transmit power, and the like. Wireless device 405 may select a beam configuration for the LBT procedure (e.g., an LBT beam configuration) that is the same as or different from the beam configuration selected for the wireless transmission.

At 420, wireless device 405 may optionally determine additional parameters to use when selecting an LBT detection threshold for the LBT procedure. In some aspects, the additional parameters may be considered individually, or in any combination.

In some aspects, the LBT detection threshold may be selected based on additional parameters such as whether the wireless transmission is an RRQ signal, an RRS signal, an interference discovery signal, the transmission rank of the wireless transmission, an operator associated with the wireless device 405, a QoS metric for the wireless transmission, a transmission direction of the wireless transmission, and the like. In some aspects, the LBT detection threshold may be selected based on additional parameters associated with an interfering transmission detected during the LBT procedure, e.g., whether the interfering transmission is an RRQ signal, an RRS signal, is an interference discovery signal, the transmission rank of the interfering transmission, an operator associated with the wireless device transmitting the interfering transmission (e.g., different from the operator of the wireless device 405), a QoS metric for the interfering transmission, a transmission direction of the interfering transmission, and the like. In some aspects, the LBT detection threshold may be selected based on an expected receive signal strength value for a scheduled wireless communication to the wireless device 405.

In some aspects, the LBT detection threshold may be selected based on whether the LBT beam configuration is the same as the beam configuration selected for the wireless transmission. For example, wireless device 405 may apply an offset to the LBT detection threshold when the LBT beam configuration is different from the beam configuration for the wireless transmission. The offset may be a function of the differences in beam width between the LBT beam configuration and the beam configuration selected for the wireless transmission.

At 425, wireless device 405 may perform an LBT procedure on the channel using the selected LBT detection threshold. The LBT procedure may be considered successful when the signal(s) detected (e.g., energy based and/or preamble based) on the channel during the LBT procedure do not satisfy or meet the LBT detection threshold and unsuccessful when the signal(s) satisfy or meet the LBT detection threshold. A successful LBT procedure may indicate that the medium is available to perform the wireless transmission and an unsuccessful LBT procedure may indicate that the medium is not available.

At 430, wireless device 405 may perform the wireless transmission on the channel to wireless device 410 and based on the success of the LBT procedure. When the LBT procedure is unsuccessful, the wireless device 405 may perform a backoff procedure and attempt a second LBT procedure on the channel after the backoff procedure.

Figure 5:
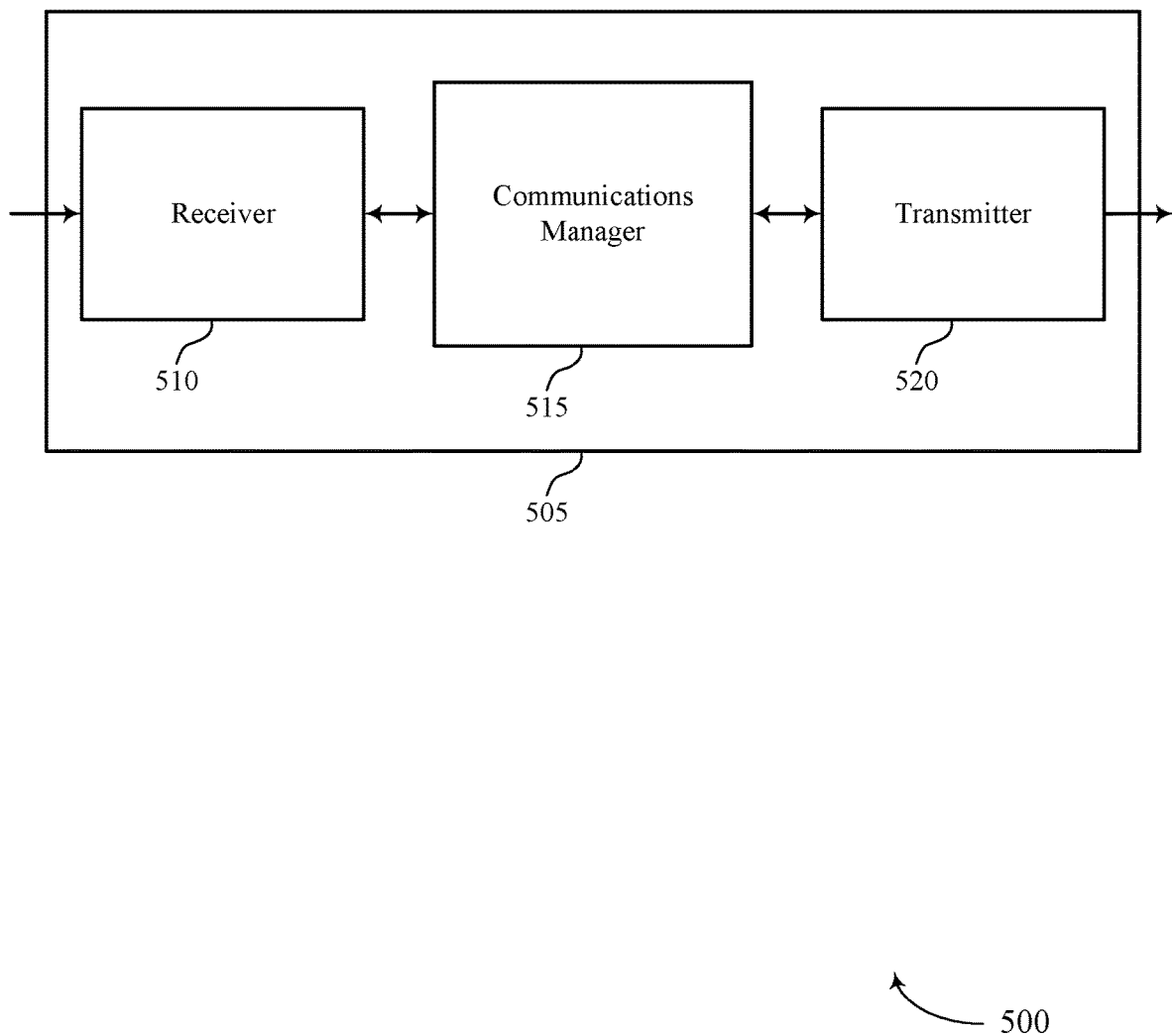
FIGS. 5 through 7 show block diagrams of a device that supports adaptive medium sensing thresholds in accordance with aspects of the present disclosure.

FIG. 5 shows a block diagram 500 of a wireless device 505 that supports adaptive medium sensing thresholds in accordance with aspects of the present disclosure. Wireless device 505 may be an example of aspects of a UE 115 or base station 105 as described herein. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to adaptive medium sensing thresholds, etc.). Information may be passed on to other components of the device. The receiver 510 may be an example of aspects of the transceiver 835 described with reference to FIG. 8. The receiver 510 may utilize a single antenna or a set of antennas.

Communications manager 515 may be an example of aspects of the UE communications manager 815 described with reference to FIG. 8.

Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 515 may select a beam configuration for a wireless transmission over a channel of a radio frequency spectrum band, perform a LBT procedure on the channel using a LBT detection threshold, where the LBT detection threshold is based on the selected beam configuration, and perform the wireless transmission over the channel using the selected beam configuration based on a success of the LBT procedure.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
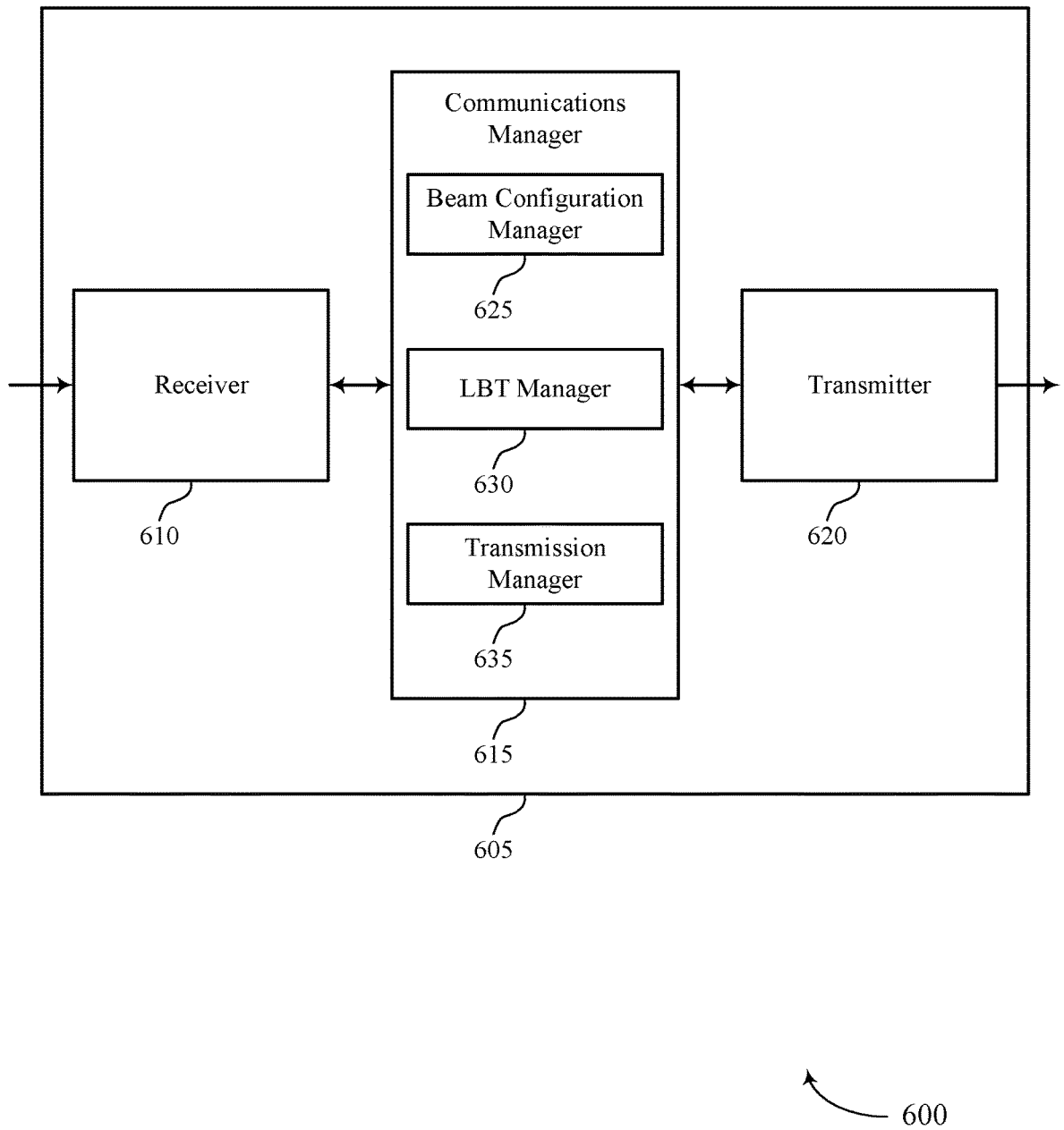

FIG. 6 shows a block diagram 600 of a wireless device 605 that supports adaptive medium sensing thresholds in accordance with aspects of the present disclosure. Wireless device 605 may be an example of aspects of a wireless device 505 or a UE 115 or base station 105 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to adaptive medium sensing thresholds, etc.). Information may be passed on to other components of the device. The receiver 610 may be an example of aspects of the transceiver 835 described with reference to FIG. 8. The receiver 610 may utilize a single antenna or a set of antennas.

Communications manager 615 may be an example of aspects of the UE communications manager 815 described with reference to FIG. 8.

Communications manager 615 may also include beam configuration manager 625, LBT manager 630, and transmission manager 635.

Beam configuration manager 625 may select a beam configuration for a wireless transmission over a channel of a radio frequency spectrum band, select an LBT beam configuration for the LBT procedure on the channel, the LBT beam configuration being the same as the beam configuration for the wireless transmission over the channel, select an LBT beam configuration for the LBT procedure on the channel, the LBT beam configuration being different from the beam configuration for the wireless transmission over the channel, and apply an offset to the LBT detection threshold based on the LBT beam configuration being different from the beam configuration for the wireless transmission over the channel. In some cases, the LBT beam configuration has a wider beam width than the beam configuration for the wireless transmission over the channel, and the offset is a function of the difference in beam width between the LBT beam configuration and the beam configuration for the wireless transmission over the channel. In some cases, the beam configuration includes at least one of: a NR-SS beam configuration, or a P1 beam configuration, or a P2 beam configuration, or a P3 beam configuration.

LBT manager 630 may perform a LBT procedure on the channel using a LBT detection threshold, where the LBT detection threshold is based on the selected beam configuration. In some cases, the LBT detection threshold includes at least one of: an energy level detection threshold, or a preamble detection threshold, or a combination thereof.

Transmission manager 635 may perform the wireless transmission over the channel using the selected beam configuration based on a success of the LBT procedure.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
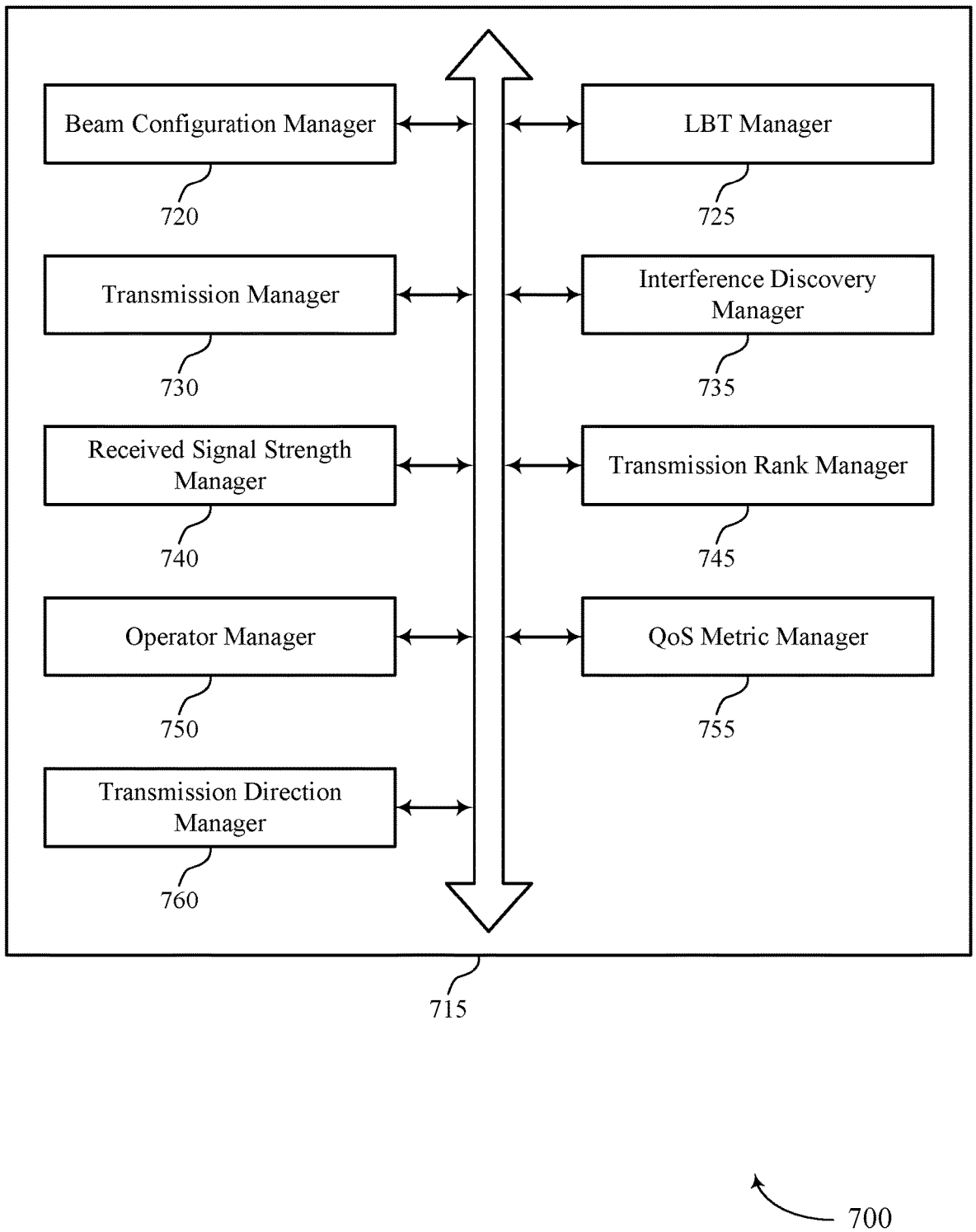

FIG. 7 shows a block diagram 700 of a communications manager 715 that supports adaptive medium sensing thresholds in accordance with aspects of the present disclosure. The communications manager 715 may be an example of aspects of a communications manager 515, a communications manager 615, or a UE communications manager 815 described with reference to FIGS. 5, 6, and 8. The communications manager 715 may include beam configuration manager 720, LBT manager 725, transmission manager 730, interference discovery manager 735, received signal strength manager 740, transmission rank manager 745, operator manager 750, QoS metric manager 755, and transmission direction manager 760. Each of these modules may communicate, directly or indirectly, with one another (e.g., via one or more buses).

Beam configuration manager 720 may select a beam configuration for a wireless transmission over a channel of a radio frequency spectrum band, select an LBT beam configuration for the LBT procedure on the channel, the LBT beam configuration being the same as the beam configuration for the wireless transmission over the channel, select an LBT beam configuration for the LBT procedure on the channel, the LBT beam configuration being different from the beam configuration for the wireless transmission over the channel, and apply an offset to the LBT detection threshold based on the LBT beam configuration being different from the beam configuration for the wireless transmission over the channel. In some cases, the LBT beam configuration has a wider beam width than the beam configuration for the wireless transmission over the channel, and the offset is a function of the difference in beam width between the LBT beam configuration and the beam configuration for the wireless transmission over the channel. In some cases, the beam configuration includes at least one of: a NR-SS beam configuration, or a P1 beam configuration, or a P2 beam configuration, or a P3 beam configuration.

LBT manager 725 may perform a LBT procedure on the channel using a LBT detection threshold, where the LBT detection threshold is based on the selected beam configuration. In some cases, the LBT detection threshold includes at least one of: an energy level detection threshold, or a preamble detection threshold, or a combination thereof.

Transmission manager 730 may perform the wireless transmission over the channel using the selected beam configuration based on a success of the LBT procedure.

Interference discovery manager 735 may determine that the wireless transmission includes a RRQ signal, select the LBT detection threshold based on the RRQ signal, determine that the wireless transmission includes a RRS signal, select the LBT detection threshold based on the RRS signal, determine that the wireless transmission includes an interference discovery signal, and select the LBT detection threshold based on the interference discovery signal.

Received signal strength manager 740 may identify an expected receive signal strength value for a scheduled wireless communication to the wireless device and select the LBT detection threshold based on the expected receive signal strength value.

Transmission rank manager 745 may identify a transmission rank associated with the wireless transmission over the channel, select the LBT detection threshold based on the transmission rank, and identify a transmission rank associated with an interfering transmission over the channel.

Operator manager 750 may determine that an interfering transmission is from a device associated with an operator that is associated with the wireless device, select the LBT detection threshold based on the operator, determine that an interfering transmission is from a device associated with a first operator that different from a second operator that is associated with the wireless device, and select the LBT detection threshold based on the first operator.

QoS metric manager 755 may identify a QoS metric associated with the wireless transmission over the channel, select the LBT detection threshold based on the QoS metric, and identify a QoS metric associated with an interfering transmission.

Transmission direction manager 760 may identify a transmission direction associated with the wireless transmission over the channel, select the LBT detection threshold based on the transmission direction, and identify a transmission direction associated with an interfering transmission over the channel.

Figure 8:
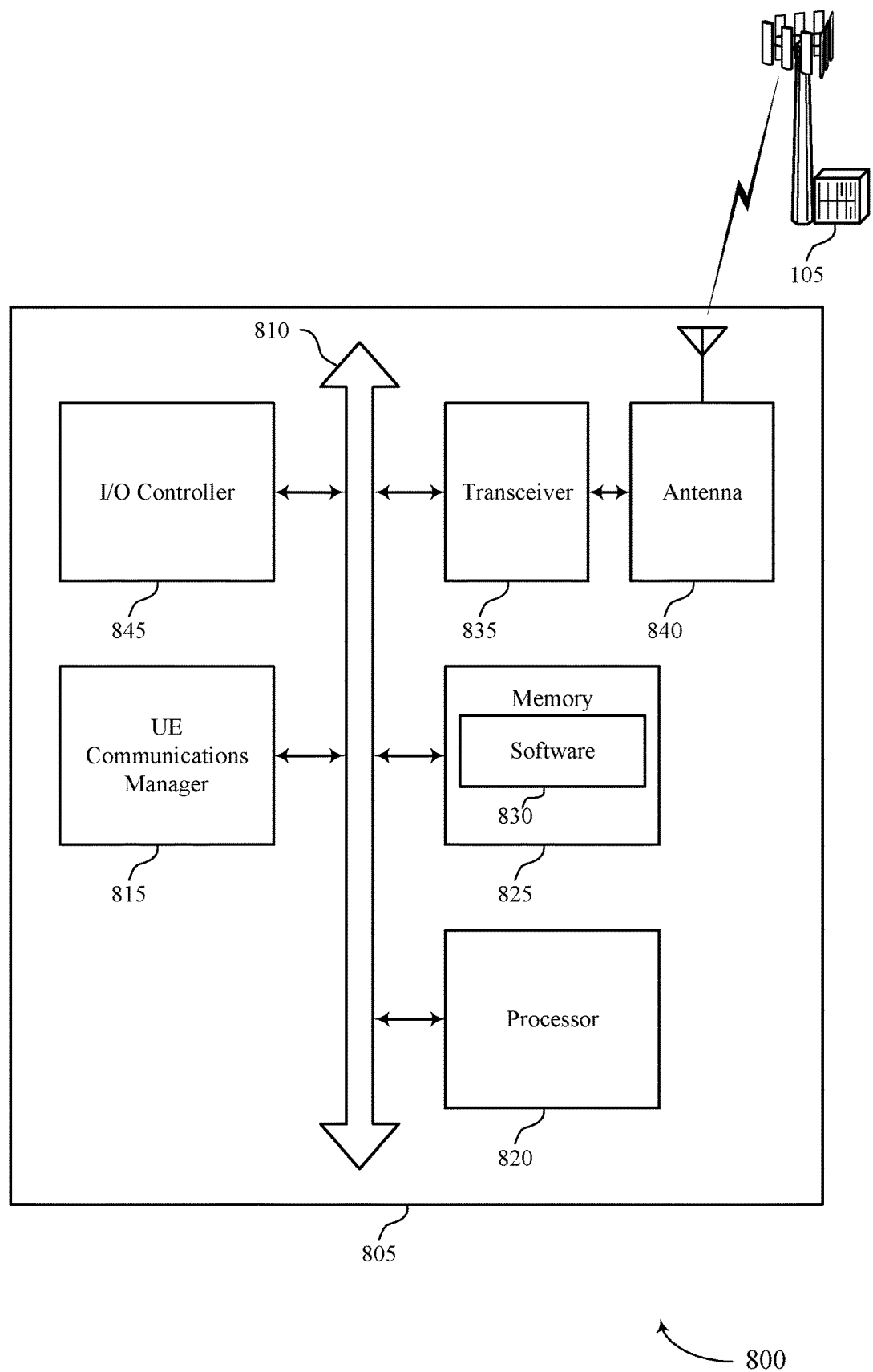
FIG. 8 illustrates a block diagram of a system including a user equipment that supports adaptive medium sensing thresholds in accordance with aspects of the present disclosure.

FIG. 8 shows a diagram of a system 800 including a device 805 that supports adaptive medium sensing thresholds in accordance with aspects of the present disclosure. Device 805 may be an example of or include the components of wireless device 505, wireless device 605, or a UE 115 as described herein. Device 805 may include components for bi-directional voice and data communications including components for transmitting and receiving communications, including UE communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting adaptive medium sensing thresholds).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support adaptive medium sensing thresholds. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
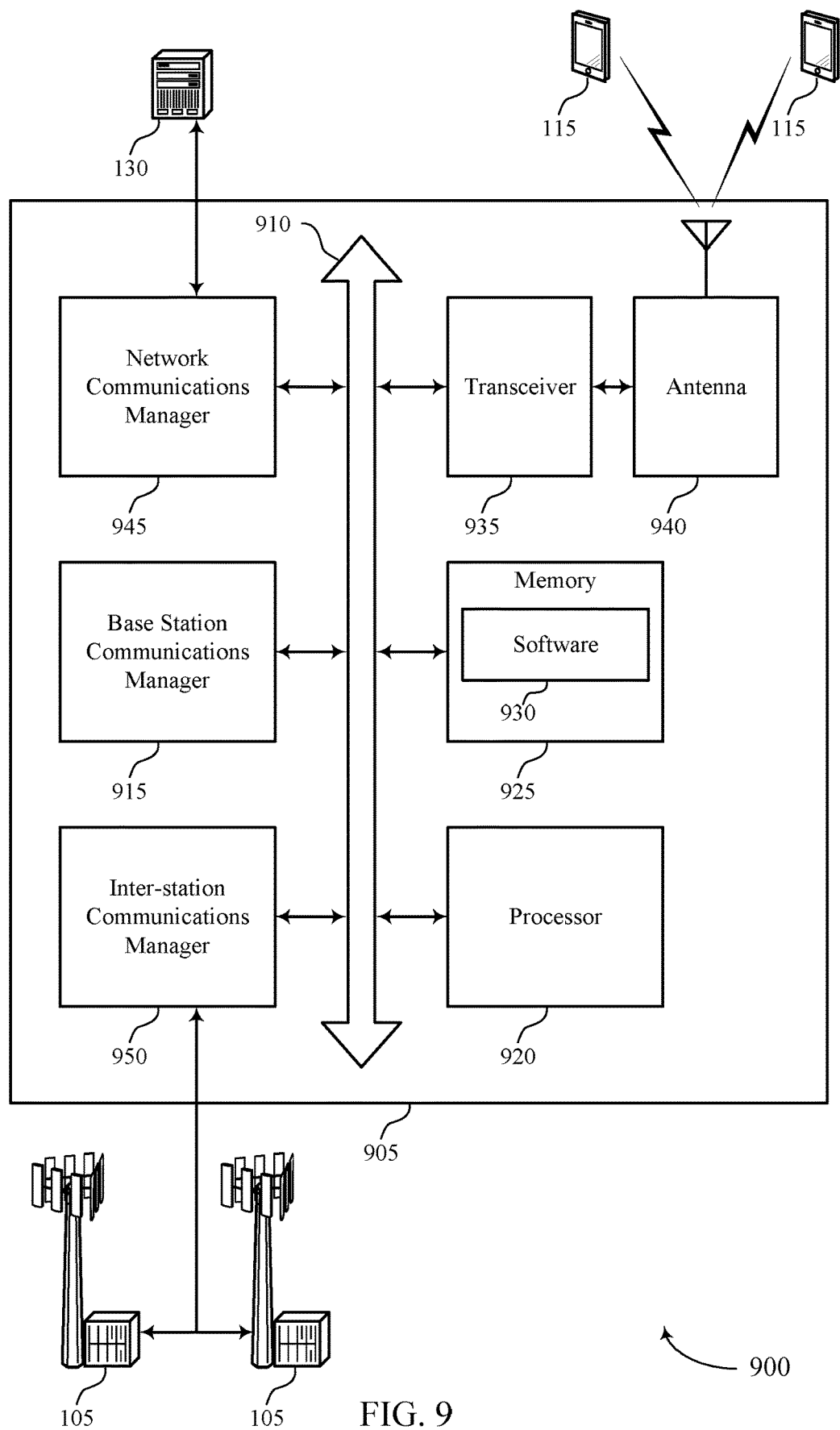
FIG. 9 illustrates a block diagram of a system including a base station that supports adaptive medium sensing thresholds in accordance with aspects of the present disclosure.

FIG. 9 shows a diagram of a system 900 including a device 905 that supports adaptive medium sensing thresholds in accordance with aspects of the present disclosure. Device 905 may be an example of or include the components of wireless device 605, wireless device 705, or a base station 105 as described herein. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting adaptive medium sensing thresholds).

Memory 925 may include RAM and ROM. The memory 925 may store computer-readable, computer-executable software 930 including instructions that, when executed, cause the processor to perform various functions described herein. In some cases, the memory 925 may contain, among other things, a BIOS which may control basic hardware or software operation such as the interaction with peripheral components or devices.

Software 930 may include code to implement aspects of the present disclosure, including code to support adaptive medium sensing thresholds. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an LTE/LTE-A wireless communication network technology to provide communication between base stations 105.

Figure 10:
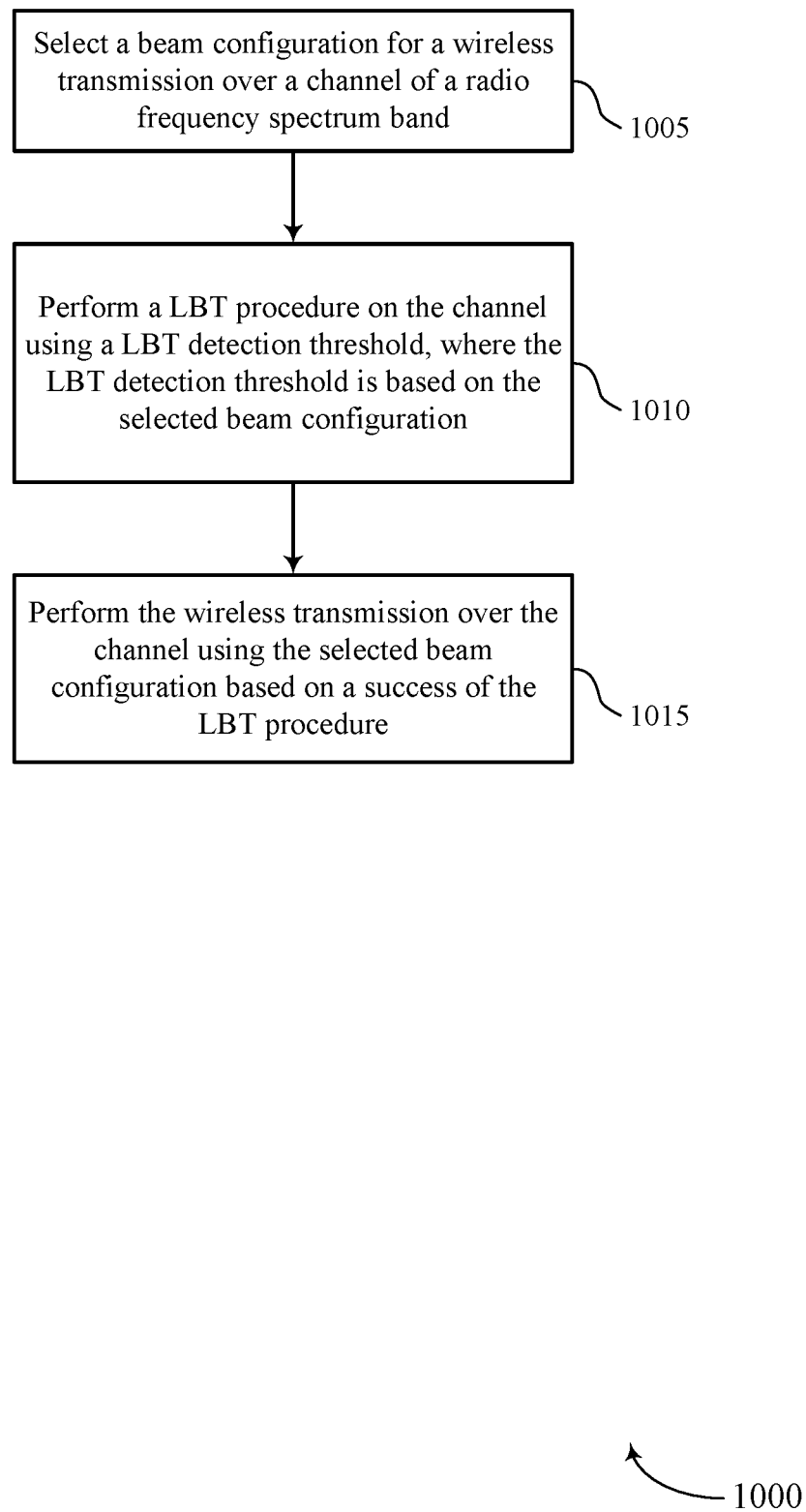
FIGS. 10 through 12 illustrate methods for adaptive medium sensing thresholds in accordance with aspects of the present disclosure.

FIG. 10 shows a flowchart illustrating a method 1000 for adaptive medium sensing thresholds in accordance with aspects of the present disclosure. The operations of method 1000 may be implemented by a UE 115 or base station 105 or its components as described herein. For example, the operations of method 1000 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1005 the UE 115 or base station 105 may select a beam configuration for a wireless transmission over a channel of a radio frequency spectrum band. The operations of 1005 may be performed according to the methods described herein. In certain examples, aspects of the operations of 1005 may be performed by a beam configuration manager as described with reference to FIGS. 5 through 7.

At 1010 the UE 115 or base station 105 may perform a LBT procedure on the channel using a LBT detection threshold, wherein the LBT detection threshold is based at least in part on the selected beam configuration. The operations of 1010 may be performed according to the methods described herein. In certain examples, aspects of the operations of 1010 may be performed by a LBT manager as described with reference to FIGS. 5 through 7.

At 1015 the UE 115 or base station 105 may perform the wireless transmission over the channel using the selected beam configuration based at least in part on a success of the LBT procedure. The operations of 1015 may be performed according to the methods described herein. In certain examples, aspects of the operations of 1015 may be performed by a transmission manager as described with reference to FIGS. 5 through 7.

Figure 11:
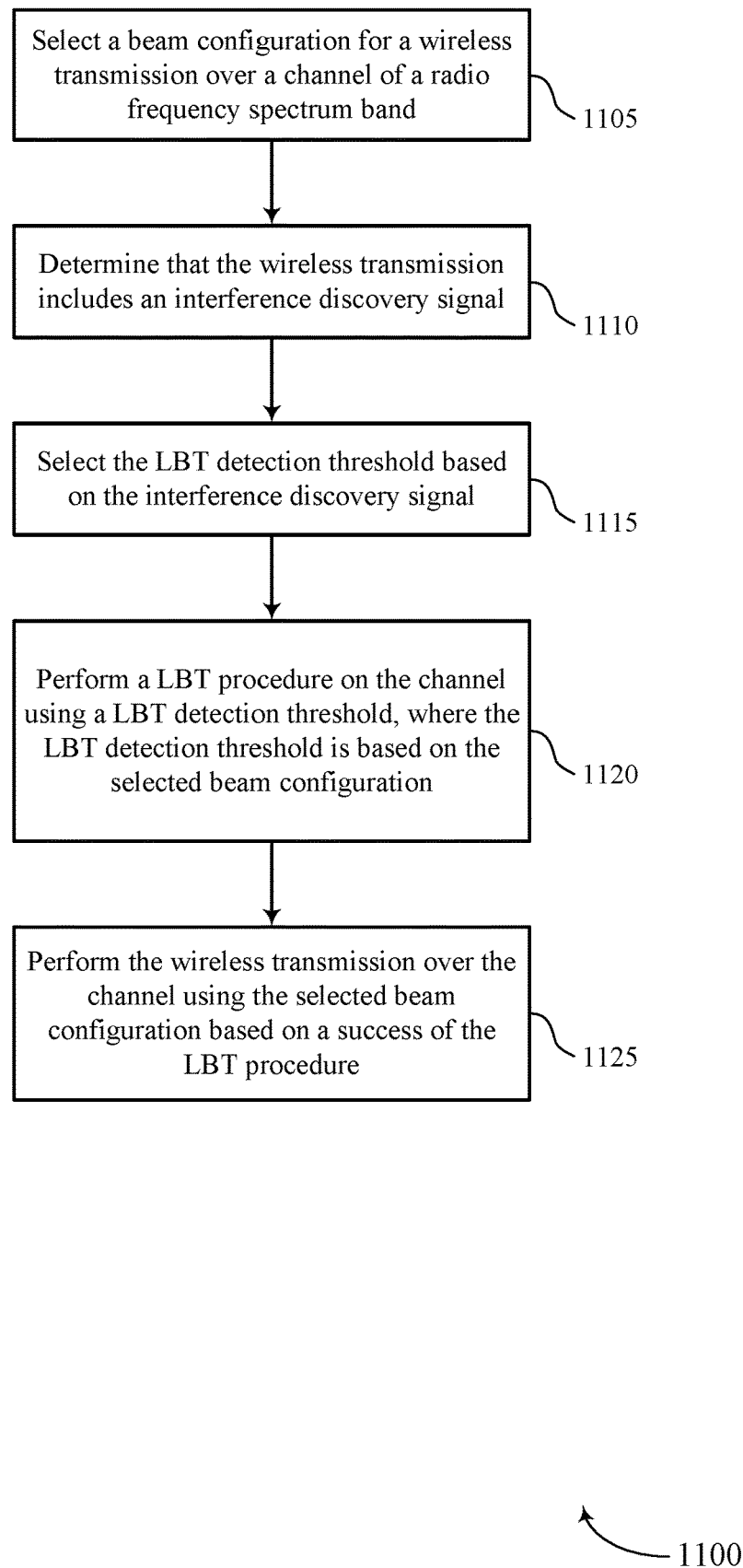

FIG. 11 shows a flowchart illustrating a method 1100 for adaptive medium sensing thresholds in accordance with aspects of the present disclosure. The operations of method 1100 may be implemented by a UE 115 or base station 105 or its components as described herein. For example, the operations of method 1100 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1105 the UE 115 or base station 105 may select a beam configuration for a wireless transmission over a channel of a radio frequency spectrum band. The operations of 1105 may be performed according to the methods described herein. In certain examples, aspects of the operations of 1105 may be performed by a beam configuration manager as described with reference to FIGS. 5 through 7.

At 1110 the UE 115 or base station 105 may determine that the wireless transmission comprises an interference discovery signal. The operations of 1110 may be performed according to the methods described herein. In certain examples, aspects of the operations of 1110 may be performed by an interference discovery manager as described with reference to FIGS. 5 through 7.

At 1115 the UE 115 or base station 105 may select the LBT detection threshold based at least in part on the interference discovery signal. The operations of 1115 may be performed according to the methods described herein. In certain examples, aspects of the operations of 1115 may be performed by an interference discovery manager as described with reference to FIGS. 5 through 7.

At 1120 the UE 115 or base station 105 may perform a LBT procedure on the channel using a LBT detection threshold, wherein the LBT detection threshold is based at least in part on the selected beam configuration. The operations of 1120 may be performed according to the methods described herein. In certain examples, aspects of the operations of 1120 may be performed by a LBT manager as described with reference to FIGS. 5 through 7.

At 1125 the UE 115 or base station 105 may perform the wireless transmission over the channel using the selected beam configuration based at least in part on a success of the LBT procedure. The operations of 1125 may be performed according to the methods described herein. In certain examples, aspects of the operations of 1125 may be performed by a transmission manager as described with reference to FIGS. 5 through 7.

Figure 12:
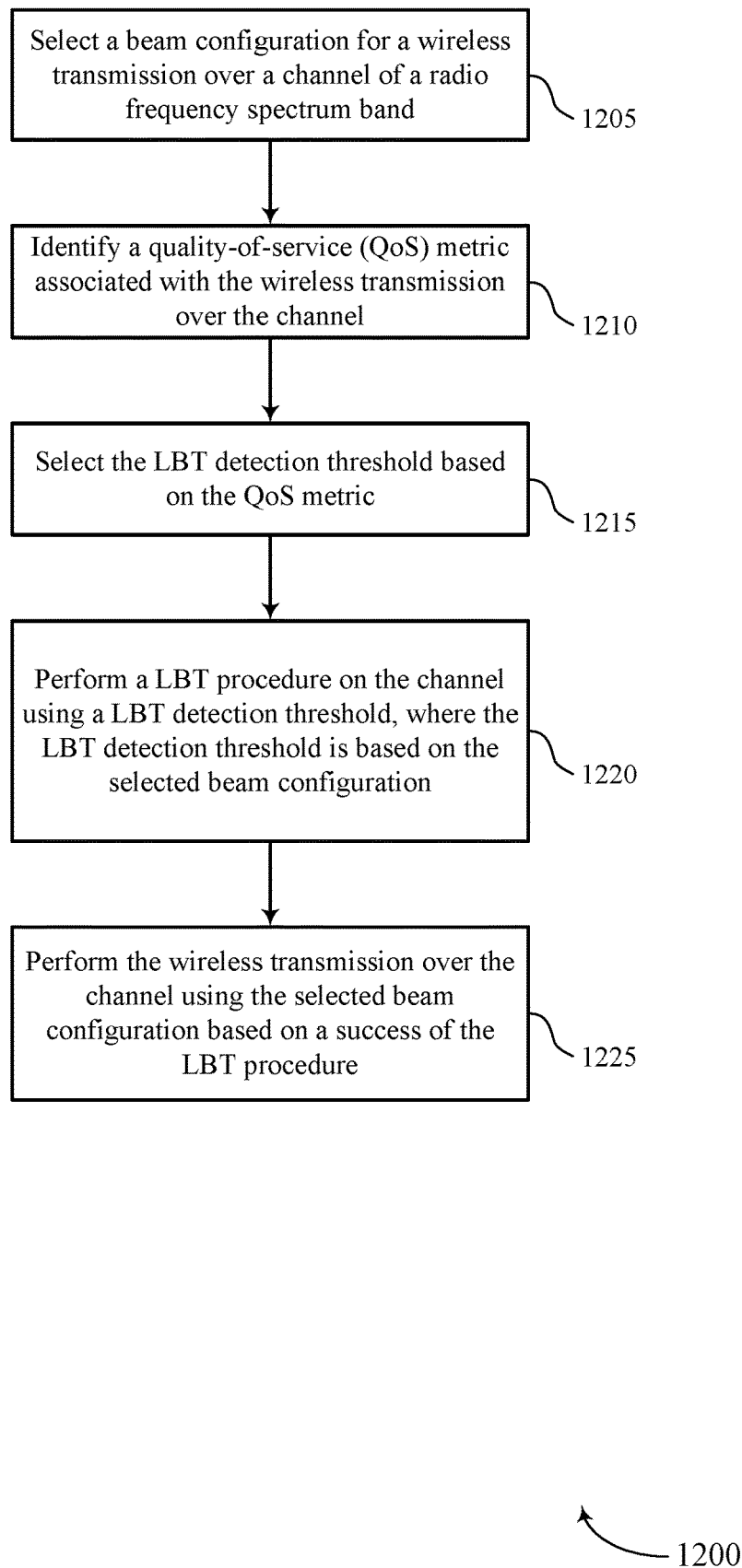

FIG. 12 shows a flowchart illustrating a method 1200 for adaptive medium sensing thresholds in accordance with aspects of the present disclosure. The operations of method 1200 may be implemented by a UE 115 or base station 105 or its components as described herein. For example, the operations of method 1200 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At 1205 the UE 115 or base station 105 may select a beam configuration for a wireless transmission over a channel of a radio frequency spectrum band. The operations of 1205 may be performed according to the methods described herein. In certain examples, aspects of the operations of 1205 may be performed by a beam configuration manager as described with reference to FIGS. 5 through 7.

At 1210 the UE 115 or base station 105 may identify a QoS metric associated with the wireless transmission over the channel. The operations of 1210 may be performed according to the methods described herein. In certain examples, aspects of the operations of 1210 may be performed by a QoS metric manager as described with reference to FIGS. 5 through 7.

At 1215 the UE 115 or base station 105 may select the LBT detection threshold based at least in part on the QoS metric. The operations of 1215 may be performed according to the methods described herein. In certain examples, aspects of the operations of 1215 may be performed by a QoS metric manager as described with reference to FIGS. 5 through 7.

At 1220 the UE 115 or base station 105 may perform a LBT procedure on the channel using a LBT detection threshold, wherein the LBT detection threshold is based at least in part on the selected beam configuration. The operations of 1220 may be performed according to the methods described herein. In certain examples, aspects of the operations of 1220 may be performed by a LBT manager as described with reference to FIGS. 5 through 7.

At 1225 the UE 115 or base station 105 may perform the wireless transmission over the channel using the selected beam configuration based at least in part on a success of the LBT procedure. The operations of 1225 may be performed according to the methods described herein. In certain examples, aspects of the operations of 1225 may be performed by a transmission manager as described with reference to FIGS. 5 through 7.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a wireless device, comprising:
    selecting a beam configuration for a wireless transmission over a channel of a radio frequency spectrum band;
    selecting a listen-before-talk (LBT) detection threshold for an LBT procedure based at least in part on the selected beam configuration;
    performing the LBT procedure on the channel using the LBT detection threshold, wherein the LBT procedure comprises comparing a signal detected on the channel to the LBT detection threshold to determine whether the detected signal satisfies the LBT detection threshold; and
    performing the wireless transmission over the channel using the selected beam configuration based at least in part on a success of the LBT procedure.

2. The method of claim 1, further comprising:
selecting an LBT beam configuration for the LBT procedure on the channel, the LBT beam configuration being the same as the beam configuration for the wireless transmission over the channel.

3. The method of claim 1, further comprising:
selecting an LBT beam configuration for the LBT procedure on the channel, the LBT beam configuration being different from the beam configuration for the wireless transmission over the channel; and
applying an offset to the LBT detection threshold based at least in part on the LBT beam configuration being different from the beam configuration for the wireless transmission over the channel.

4. The method of claim 3, wherein the LBT beam configuration has a wider beam width than the beam configuration for the wireless transmission over the channel, and the offset is a function of a difference in beam width between the LBT beam configuration and the beam configuration for the wireless transmission over the channel.

5. The method of claim 1, further comprising:
determining that the wireless transmission comprises a reservation request (RRQ) signal; and
selecting the LBT detection threshold based at least in part on the RRQ signal.

6. The method of claim 1, further comprising:
determining that the wireless transmission comprises a reservation response (RRS) signal; and
selecting the LBT detection threshold based at least in part on the RRS signal.

7. The method of claim 1, further comprising:
determining that the wireless transmission comprises an interference discovery signal; and
selecting the LBT detection threshold based at least in part on the interference discovery signal.

8. The method of claim 1, further comprising:
identifying an expected receive signal strength value for a scheduled wireless communication to the wireless device; and
selecting the LBT detection threshold based at least in part on the expected receive signal strength value.

9. The method of claim 1, further comprising:
identifying a transmission rank associated with the wireless transmission over the channel; and
selecting the LBT detection threshold based at least in part on the transmission rank.

10. The method of claim 1, further comprising:
identifying a transmission rank associated with an interfering transmission over the channel; and
selecting the LBT detection threshold based at least in part on the transmission rank.

11. The method of claim 1, further comprising:
determining that an interfering transmission is from a device associated with an operator that is associated with the wireless device; and
selecting the LBT detection threshold based at least in part on the operator.

12. The method of claim 1, further comprising:
determining that an interfering transmission is from a device associated with a first operator that different from a second operator that is associated with the wireless device; and
selecting the LBT detection threshold based at least in part on the first operator.

13. The method of claim 1, further comprising:
identifying a quality-of-service (QoS) metric associated with the wireless transmission over the channel; and
selecting the LBT detection threshold based at least in part on the QoS metric.

14. The method of claim 1, further comprising:
identifying a quality-of-service (QoS) metric associated with an interfering transmission; and
selecting the LBT detection threshold based at least in part on the QoS metric.

15. The method of claim 1, further comprising:
identifying a transmission direction associated with the wireless transmission over the channel; and
selecting the LBT detection threshold based at least in part on the transmission direction.

16. The method of claim 1, further comprising:
identifying a transmission direction associated with an interfering transmission over the channel; and
selecting the LBT detection threshold based at least in part on the transmission direction.

17. The method of claim 1, wherein the beam configuration comprises at least one of: a new radio synchronization signal (NR-SS) beam configuration, or a P1 beam configuration, or a P2 beam configuration, or a P3 beam configuration.

18. The method of claim 1, wherein the LBT detection threshold comprises at least one of: an energy level detection threshold, or a preamble detection threshold, or a combination thereof.

19. An apparatus for wireless communication, comprising:
means for selecting a beam configuration for a wireless transmission over a channel of a radio frequency spectrum band;
means for selecting a listen-before-talk (LBT) detection threshold for an LBT procedure based at least in part on the selected beam configuration;
means for performing the LBT procedure on the channel using the LBT detection threshold, wherein the LBT procedure comprises comparing a signal detected on the channel to the LBT detection threshold to determine whether the detected signal satisfies the LBT detection threshold is based at least in part on the selected beam configuration; and
means for performing the wireless transmission over the channel using the selected beam configuration based at least in part on a success of the LBT procedure.

20. An apparatus for wireless communication, comprising:
a processor;
memory in electronic communication with the processor; and
instructions stored in the memory and executable by the processor to cause the apparatus to:
select a beam configuration for a wireless transmission over a channel of a radio frequency spectrum band;
select a listen-before-talk (LBT) detection threshold for an LBT procedure based at least in part on the selected beam configuration;
perform the LBT procedure on the channel using the LBT detection threshold, wherein the LBT procedure comprises comparing a signal detected on the channel to the LBT detection threshold to determine whether the detected signal satisfies the LBT detection threshold; and
perform the wireless transmission over the channel using the selected beam configuration based at least in part on a success of the LBT procedure.

21. The apparatus of claim 20, wherein the instructions are further executable by the processor to cause the apparatus to:
  select an LBT beam configuration for the LBT procedure on the channel, the LBT beam configuration being the same as the beam configuration for the wireless transmission over the channel.

22. The apparatus of claim 20, wherein the instructions are further executable by the processor to cause the apparatus to:
  select an LBT beam configuration for the LBT procedure on the channel, the LBT beam configuration being different from the beam configuration for the wireless transmission over the channel; and
  apply an offset to the LBT detection threshold based at least in part on the LBT beam configuration being different from the beam configuration for the wireless transmission over the channel.

23. The apparatus of claim 22, wherein the LBT beam configuration has a wider beam width than the beam configuration for the wireless transmission over the channel, and the offset is a function of a difference in beam width between the LBT beam configuration and the beam configuration for the wireless transmission over the channel.

24. The apparatus of claim 20, wherein the instructions are further executable by the processor to cause the apparatus to:
  determine that the wireless transmission comprises a reservation request (RRQ) signal; and
  select the LBT detection threshold based at least in part on the RRQ signal.

25. The apparatus of claim 20, wherein the instructions are further executable by the processor to cause the apparatus to:
  determine that the wireless transmission comprises a reservation response (RRS) signal; and
  select the LBT detection threshold based at least in part on the RRS signal.

26. The apparatus of claim 20, wherein the instructions are further executable by the processor to cause the apparatus to:
  determine that the wireless transmission comprises an interference discovery signal; and
  select the LBT detection threshold based at least in part on the interference discovery signal.

27. The apparatus of claim 20, wherein the instructions are further executable by the processor to cause the apparatus to:
  identify an expected receive signal strength value for a scheduled wireless communication to the apparatus; and
  select the LBT detection threshold based at least in part on the expected receive signal strength value.

28. The apparatus of claim 20, wherein the instructions are further executable by the processor to cause the apparatus to:
  identify a transmission rank associated with the wireless transmission over the channel; and
  select the LBT detection threshold based at least in part on the transmission rank.

29. The apparatus of claim 20, wherein the instructions are further executable by the processor to cause the apparatus to:
  identify a transmission rank associated with an interfering transmission over the channel; and
  select the LBT detection threshold based at least in part on the transmission rank.

30. A non-transitory computer-readable medium storing code for wireless communication, the code comprising instructions executable by a processor to:
  select a beam configuration for a wireless transmission over a channel of a radio frequency spectrum band;
  select a listen-before-talk (LBT) detection threshold for an LBT procedure based at least in part on the selected beam configuration;
  perform the LBT procedure on the channel using the LBT detection threshold, wherein the LBT procedure comprises comparing a signal detected on the channel to the LBT detection threshold to determine whether the detected signal satisfies the LBT detection threshold; and
  perform the wireless transmission over the channel using the selected beam configuration based at least in part on a success of the LBT procedure.

* * * * *